Aug. 13, 1929.   J. T. MacGREGOR-MORRIS   1,724,296
APPARATUS FOR MEASURING THE VELOCITIES OF FLUIDS
Filed March 4, 1926   2 Sheets-Sheet 1
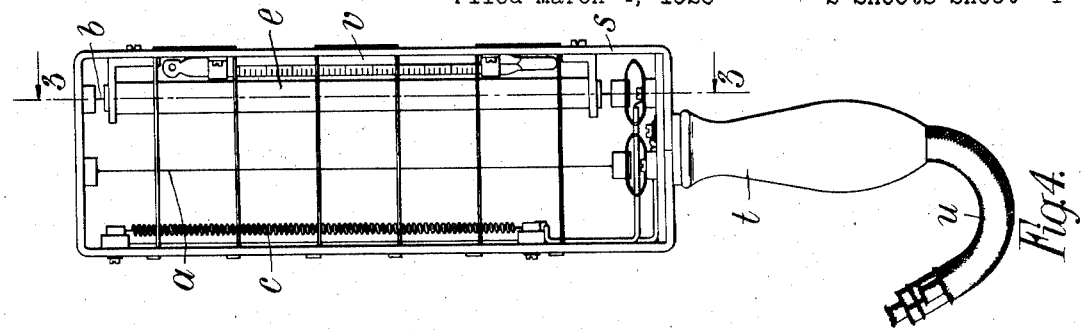
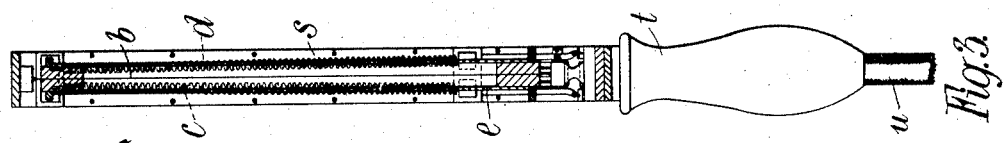
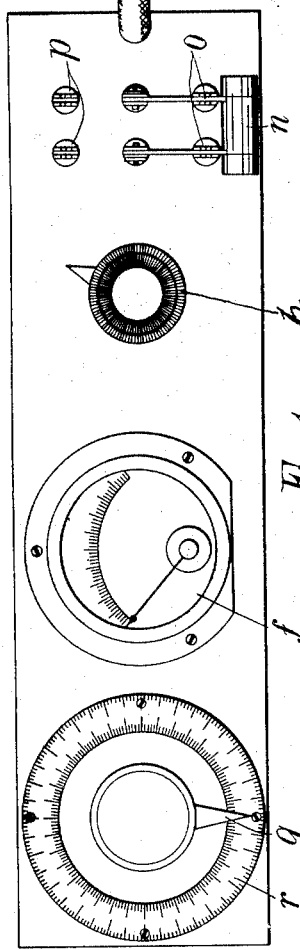
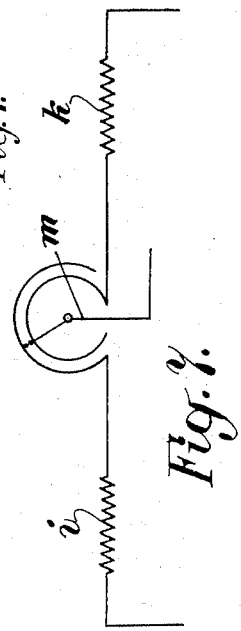
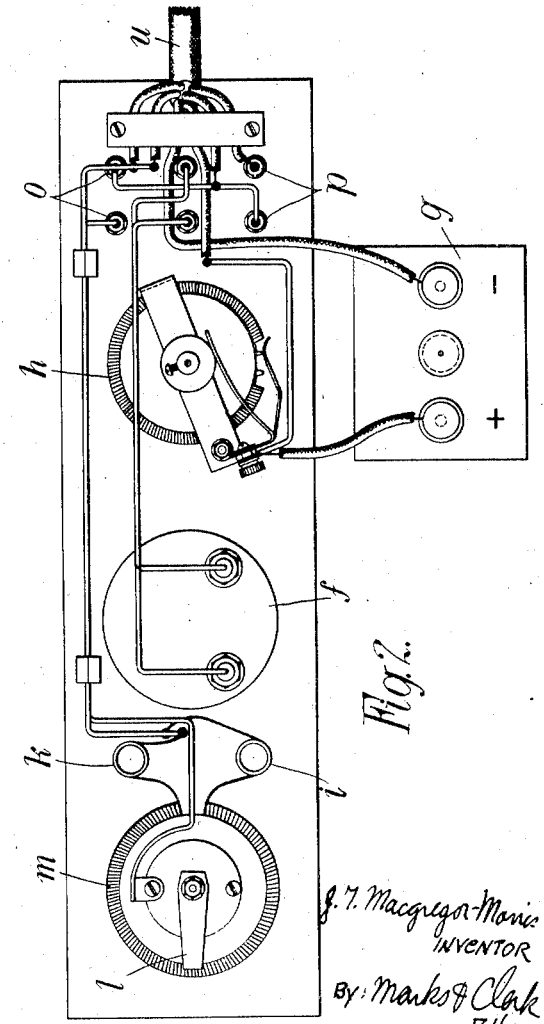

Aug. 13, 1929.  J. T. MacGREGOR-MORRIS  1,724,296
APPARATUS FOR MEASURING THE VELOCITIES OF FLUIDS
Filed March 4, 1926   2 Sheets-Sheet 2

J. T. Macgregor-Morris
INVENTOR

By: Marks & Clerk
Attys

Patented Aug. 13, 1929.

1,724,296

UNITED STATES PATENT OFFICE.

JOHN TURNER MacGREGOR-MORRIS, OF HAMPSTEAD, LONDON, ENGLAND.

APPARATUS FOR MEASURING THE VELOCITIES OF FLUIDS.

Application filed March 4, 1926, Serial No. 92,338, and in Great Britain August 1, 1925.

This invention relates to apparatus for measuring the velocities of gases, vapours, or fluids generally of the kind employing a Wheatstone bridge or like network (hereinafter referred to as a Wheatstone bridge) with one or more arms or branches protected or enclosed and the other arms exposed, the velocity being obtained from a consideration of the deflection of the galvanometer or the like connected across the bridge.

Known instruments of this kind depend for their results upon a measurement of the current passing through the galvanometer and as the deflection of the galvanometer is proportional in general to the cube of the main current the instrument necessitates a very accurate ammeter if its galvanometer indications are required to have a fair degree of accuracy.

Furthermore with existing apparatus troublesome adjustments have had to be made for variations in the temperature of the medium whose velocity is to be measured, and this is a very considerable drawback when the apparatus is to be employed in mines or situations where such variations are liable to occur.

The object of the present invention is to eliminate the above and other disadvantages of existing apparatus and according to my invention I form my improved apparatus to determine accurately the value of a current by means of its heating effect in changing the resistance of a conductor by its passage through it thus giving a much more precise method of determining when a current has a definite value and one which at the same time is likely to be much more constant. Furthermore I standardize my readings upon the zero indicator principle which does not depend upon any specific measurement of current.

More specifically I form my apparatus with a Wheatstone bridge with one or more arms shielded or enclosed and in association therewith I provide a second or standardizing bridge having two of its arms (one of which may be the enclosed or shielded arm) common to the first mentioned bridge, and means for switching the galvanometer or the like from one bridge to the other for calibration.

The invention also consists in means for applying corrections for temperatures and other details and arrangements hereinafter described or indicated.

The accompanying drawings illustrate one mode of carrying out the invention.

Figure 1 is a plan view of a part of one form of apparatus in accordance with the invention.

Figure 2 is an underneath plan view of Figure 1.

Figure 3 is a section on the line 3—3 of Figure 4, and

Figure 4 is a front elevation of a further part of the apparatus.

Figure 7 shows a modification of part of the circuit diagram.

Figure 5:
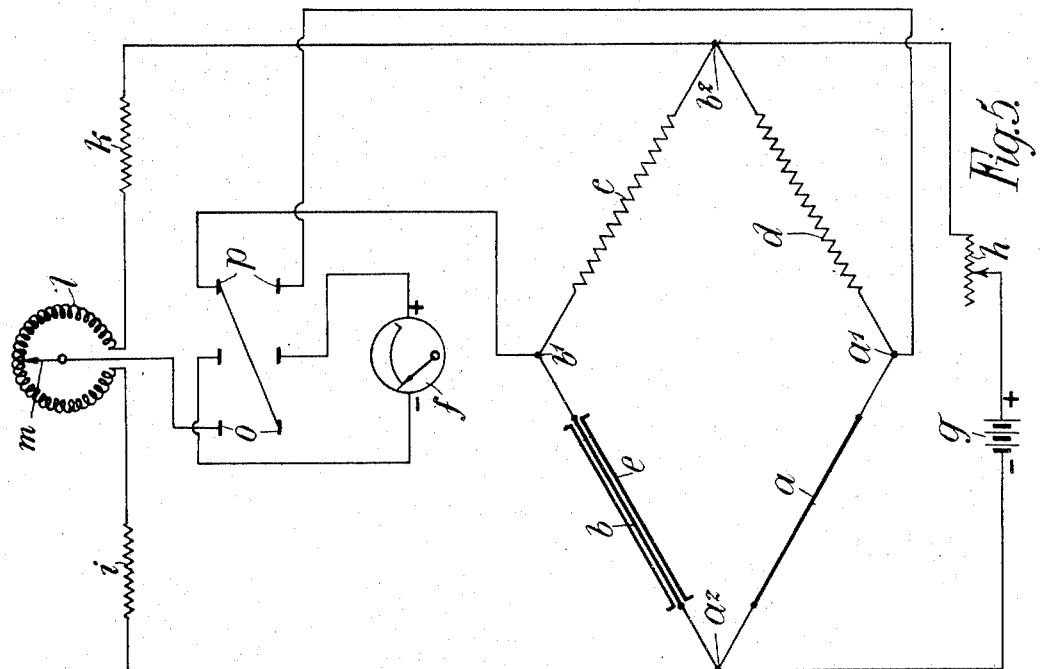
Figure 5 is a circuit diagram of the apparatus.

In carrying my invention into effect in the manner illustrated I form my improved apparatus with two wires $a\ b$ of nickel or other suitable material having a resistivity temperature co-efficient of appreciable magnitude, such wires being connected together at one end to form two arms of a Wheatstone bridge, the other arms of which are formed of manganin resistances $c\ d$ which are connected together at one end and at the other ends to the nickel or like wires as shown in Figure 5. One of the nickel wires $a$ is exposed while the other $b$ is shielded by means of a tube or envelope $e$ and the resistances are so chosen that they are preferably all equal.

The galvanometer, milliammeter or the like $f$ is adapted to be connected across the points $a'\ b'$ at which the nickel and manganin wires meet, while a battery $g$ or other source of current associated with a rheostat $h$ is connected across the points $a^2\ b^2$ at which the nickel wires and the manganin wires respectively are connected together.

Across the points $a^2$ and $b^2$ I arrange also two nearly equal resistances $i\ k$ preferably of manganin wire and preferably also of considerably higher magnitude than the resistances of the wires $c\ d$ above referred to, the manganin resistances $i$ and $k$ being connected together by a wire loop $l$ which is associated with a contact arm $m$.

There is also provided a double pole change-over switch *n* which may be associated with either of two pairs of contacts *o* or *p*, the arrangement being such that when the switch is moved so as to make contact with *o* one terminal of the instrument *f* is connected to the contact arm *m* so that in this position the resistances *i k c* and *b* form a bridge with the instrument *f* connected across it. This bridge is employed for standardizing purposes and with the contact arm *m* at its zero or other fixed position the current from the battery is adjusted until the bridge is in balance. The switch is then moved over into the position *p* so that the instrument *f* is connected across the main bridge composed of the arms *a b c* and *d* and the apparatus may then be used for measuring the velocity of the air or any medium in which the apparatus is placed, such velocity depending upon the difference in the resistance of the exposed and shielded nickel wires. Ordinarily the apparatus would be adjusted for some definite temperature in excess of atmospheric temperature and a chart of velocities co-ordinated with galvanometer deflections at such temperature would be supplied with the apparatus.

Figure 6:
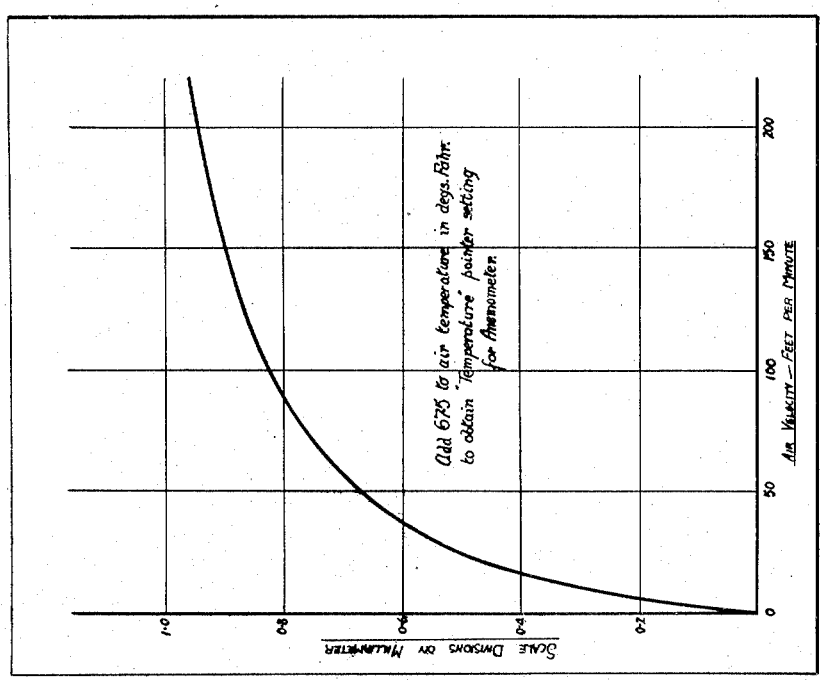
Figure 6 is a chart that may be supplied with the apparatus.

Figure 6 shows one form of chart which has been produced for an instrument in which the temperature of the enclosed wire exceeds atmospheric temperature by 67.5° F., the ordinates showing scale divisions on the milliammeter and the abscissæ air velocity in feet per minute.

As the readings of the apparatus would be affected by variations in the temperature of the medium in which the same is located as compared with the standard temperature of the apparatus I preferably provide means for supplying a temperature correction and the contact arm *m* and loop of wire *l* provide convenient means for this purpose since the apparatus may be calibrated for different temperatures by providing a suitable scale of temperatures in association with the wire loop so that for any given temperature of medium the apparatus may be set to operate for that temperature by setting the contact arm against such temperature on the scale of temperatures. Thus in Figure 1 there is shown a pointer or index *q* which is rotatable with the contact arm *m* and which is associated with a temperature scare *r* suitably calibrated so that the correct temperature setting may be given upon the apparatus.

In a simpler form of apparatus which may be more or less automatic or semi-automatic as regards temperature correction I form the supplementary or standardizing bridge resistances of materials corresponding to the other arms of such bridge. Thus, for example, where in the main bridge I employ nickel and manganin wires respectively the supplementary wires *i k* would also be nickel and manganin and this apparatus would provide automatic correction for the particular temperature for which the apparatus was calibrated.

In this case the pointer *m* and loop *l* may be dispensed with, or if provided, the pointer *m* may be soldered or otherwise fixed in position after the necessary adjustment has been made in the course of manufacture.

A more accurate form of the last mentioned apparatus designed to correct for the variations in the cooling effect of air at different temperatures may be produced by arranging to vary the proportion of nickel and manganin, by varying the point at which such wires may be connected together, this being effected as shown in Figure 7 by having separate loops of nickel and manganin and a sliding connector adapted to connect these together at different points according to the temperature at which the apparatus is to operate.

In a further alternative I arrange the bridge itself to act as a thermometer by arranging to throw in extra resistance just before the rheostat *h* cuts off.

When thus using the bridge as a thermometer the normal heating current through the enclosed wire can easily be cut down to, say, one-fifth of its working value. This will reduce the excess of temperature of the enclosed wire from, say for example, 50° excess down to 2° excess, i. e. $50° \times 1/5^2 = 2°$. If then the temperature indicator be turned to obtain a balance, say at 22° C., then the indicator is moved up to $22 + (50° - 2°) = 70°$ centigrade. Now the current is increased through the bridge by the ordinary rheostat until balance is again attained. Then the enclosed wire must be 50° C. above the temperature of the air in the neighbourhood of the enclosure surrounding the enclosed wire.

Although I have found that good results may be obtained by making the resistances of each of the arms of the main bridge of one ohm while each of the supplementary resistances is ten ohms it is to be understood that these figures are given purely by way of example and may be varied in any manner that may be found desirable.

Furthermore, I may vary the materials employed for the various resistances (in which connection nickel and manganin are to be taken purely as examples) and I may vary the manner of disposing the different resistances, the means adopted for shielding or protecting one of such resistances (or more than one if greater sensitivity is required) and may also adopt any suitable means for arranging the location of the apparatus in the medium of which the velocity is to be measured and any suitable form of box or casing containing the various parts of the apparatus depending upon the purpose for which, or situation in which it is to be employed or any practical requirements which may have to be fulfilled.

In the example shown in Figures 1 to 4 the exposed and shielded nickel wires and also the manganin wires of the main bridge are carried in a suitable anemometer head $s$ provided with a handle $t$ by which it may be manipulated and connected with the main part of the apparatus by any suitable length of flexible lead $u$, the anemometer also carrying the thermometer $v$ by means of which the temperature may be ascertained, this thermometer however being unnecessary when the bridge itself is employed for calibrating for temperatures.

Having now described my invention, what I claim as new and desire to secure by Letters Patent is:—

1. Apparatus for measuring the velocity of fluids comprising a Wheatstone bridge, a shield enclosing one arm of said bridge, another arm being adapted to be influenced by the fluids, a second standardizing bridge having two of its arms common to the first mentioned bridge, a galvanometer and means for switching said galvanometer from one bridge to the other.

2. Apparatus for measuring the velocity of fluids comprising two Wheatstone bridges with two arms common to the two, a current measuring instrument, means for switching said instrument from one bridge to the other and means for applying temperature corrections to the apparatus.

3. Apparatus for measuring the velocity of fluids comprising a Wheatstone bridge, a shield enclosing one arm thereof, a second arm being adapted to be influenced by the fluids, a supplementary bridge comprising said enclosed arm and another arm of the main bridge, a current measuring instrument, means for connecting said measuring instrument to one or the other of the said bridges and means for varying the relative resistances of the remaining arms of said supplementary bridge.

4. Apparatus for measuring the velocity of fluids comprising a Wheatstone bridge having an arm exposed to said fluids, a shield enclosing a further arm, two resistances connected across two of the arms of said bridge to form a supplementary bridge, a loop connecting said resistances, a rotary contact arm associated with said loop, a current measuring instrument and means for switching said current measuring instrument from one bridge to the other.

5. Apparatus for measuring the velocity of fluids comprising a Wheatstone bridge formed with two manganin arms and two nickel arms, a shield enclosing one of said angle arms, two equal manganin resistances connected across the enclosed nickel and one manganin arm of the main bridge to form a supplementary bridge, means for varying the relative resistances of the two manganin arms of said supplementary bridge, a current measuring device and means for switching said current measuring device from one bridge to the other.

6. An anemometric device comprising a Wheatstone bridge arrangement having one pair of adjacent arms of material of comparatively large resistance-temperature coefficient, the other pair of adjacent arms being of material of comparatively small resistance-temperature coefficient, a shield enclosing one of said former arms, means being provided to correct for the temperature of said shielded arm.

7. An anemometric device comprising a Wheatstone arrangement having two pairs of adjacent arms of materials of comparatively large and small resistance-temperature coefficients respectively, a shield enclosing one of the pair of arms having a comparatively large resistance-temperature coefficient, the other arm of said pair being adapted to be influenced by the moving fluid, means being provided to correct for the temperature of said shielded arm.

8. An anemometric device comprising a Wheatstone bridge arrangement, adjacent pairs of arms which are of materials of comparatively large and small resistance-temperature coefficients respectively, one of said former pair being adapted to be influenced by moving fluid, measuring means to determine the difference of resistance between said former pair, and means to correct for the temperature of the second arm of said former pair.

9. An anemometric device comprising a Wheatstone bridge arrangement, one arm of which is adapted to be influenced by moving fluid, a shield enclosing a further arm and adapted to shield the same from the fluid, a second Wheatstone bridge arrangement having two arms in common with said first arrangement, and means adapted to indicate in terms of velocity the difference of the resistance of the shielded and unshielded arms.

In testimony whereof I have signed my name to this specification.

JOHN TURNER MacGREGOR-MORRIS.